(12) United States Patent
Budmiger

(10) Patent No.: US 7,260,486 B2
(45) Date of Patent: Aug. 21, 2007

(54) METHOD FOR OPERATING AND/OR REVIEWING A MAGNETO-INDUCTIVE FLOW METER

(75) Inventor: Thomas Budmiger, Ettingen (CH)

(73) Assignee: Endress + Hauser Flowtec AG, Reinach (CH)

(*) Notice: Subject to any disclaimer, the term of this patent is extended or adjusted under 35 U.S.C. 154(b) by 0 days.

(21) Appl. No.: 11/230,497

(22) Filed: Sep. 21, 2005

(65) Prior Publication Data

US 2006/0081067 A1    Apr. 20, 2006

Related U.S. Application Data

(60) Provisional application No. 60/611,710, filed on Sep. 22, 2004.

(30) Foreign Application Priority Data

Sep. 22, 2004    (DE) ............ 10 2004 046 238

(51) Int. Cl.
*G01F 1/00* (2006.01)
(52) U.S. Cl. ............ 702/45; 702/50; 702/60; 702/64; 702/65; 702/100; 702/105; 702/179; 702/182; 702/183; 702/184; 702/185; 702/188; 702/193; 73/1.34
(58) Field of Classification Search ............ 702/45, 702/12, 50, 64, 65, 100, 105, 179, 182–185, 702/188, 193; 73/1.16, 861.12, 1.34, 861.72
See application file for complete search history.

(56) References Cited

U.S. PATENT DOCUMENTS 4,204,240 A    5/1980    Schmoock (Continued)

FOREIGN PATENT DOCUMENTS

DE    36 16407 A1    11/1987

(Continued)

*Primary Examiner*—Marc S. Hoff
*Assistant Examiner*—Phuong Huynh
(74) *Attorney, Agent, or Firm*—Bacon & Thomas, PLLC

(57) ABSTRACT

A flow meter includes a measuring tube for conveying a fluid to be measured and a magnetic field system, which has at least one field coil, through which an exciter current ($I_M$) flows, at least at times, for producing a magnetic field passing through the fluid at least partly perpendicularly to a stream direction. In the method, the voltage ($U_H$) instantaneously driving the exciter current ($I_M$) is changed at a second point in time, $t_2$, from the second voltage level, $U_{drv}$, to a third voltage level, $U_{short}$, especially to a third voltage level which is constant or controlled to be constant, in order to achieve a sinking of the electrical current strength of the exciter current ($I_M$) instantaneously flowing in the at least one field coil from the maximum current value, $I_m$, to an electrical current end value, $I_{czu}$, especially a constant end value, predetermined for the exciter current ($I_M$). In such case, the third voltage level, $U_{short}$, is chosen smaller than the second voltage level, $U_{rev}$. For determining a third point in time, $t_3$, which corresponds to the reaching of the electrical current end value, $I_c$, the exciter current $I_M$ is registered, at least at times. Based on this, a first time constant, $T_{short}$, for the magnetic field system is determined, which corresponds to a time span, $t_3-t_2$, lying between the second point in time, $t_2$, and the third point in time, $t_3$, and/or a second time constant, $T_{rev}+T_{short}$, for the magnetic field system, which corresponds to a time span, $t_3-t_1$, lying between the first point in time, $t_1$, and the third point in time, $t_3$. For determining a diagnosis value representing an instantaneous operating state of the flow meter, the determined first time constant, $T_{short}$, is then compared with a predetermined first reference value, $T_{1ref}$ and/or the determined second time constant, $T_{rev}+T_{short}$, is compared with a predetermined second reference value, $T_{2ref}$.

11 Claims, 9 Drawing Sheets

U.S. PATENT DOCUMENTS

| | | |
|---|---|---|
| 6,031,740 A | 2/2000 | Budmiger |
| 6,763,729 B1 * | 7/2004 | Matzen .................... 73/861.12 |
| 2002/0112525 A1 * | 8/2002 | Brockhaus .................. 73/1.16 |

FOREIGN PATENT DOCUMENTS

| | | |
|---|---|---|
| EP | 0 969 268 A1 | 1/2000 |
| EP | 1 108 988 A1 | 6/2001 |
| EP | 1 217 337 A3 | 6/2002 |
| EP | 1 460 394 A3 | 9/2004 |
| EP | WO 2005/012842 A1 | 2/2005 |

* cited by examiner

METHOD FOR OPERATING AND/OR REVIEWING A MAGNETO-INDUCTIVE FLOW METER

FIELD OF THE INVENTION

The invention relates to a method for reviewing a magneto-inductive flow meter having a measuring tube for conveying a fluid to be measured, a magnetic field system, which has at least one field coil flowed through, at least at times, by an exciter current for producing a magnetic field passing through the fluid at least, in part, perpendicularly to a stream, or flow, direction.

BACKGROUND OF THE INVENTION

For measuring electrically conductive fluids, flow meters using a magneto-inductive flow pickup are often employed. In the following, when necessary, for the sake of simplicity, discussion will only be in terms of flow pickups, or flow meters, as the case may be. As is known, magneto-inductive flow meters permit measurement of the volume flow rate of an electrically conductive liquid flowing in a pipeline and the reflecting of such in a corresponding, measured value; thus, the volume of liquid flowing through a pipe cross section per unit time is measured. Construction and operation of magneto-inductive flow meters are known, per se, to those skilled in the art and are described extensively and in detail in DE-A 43 26 991, EP-A 1 275 940, EP-A 1 273 892, EP-A 1 273 891, EP-A 814 324, EP-A 770 855, EP-A 521 169, U.S. Pat. Nos. 6,031,740, 5,487,310, 5,210,496, 4,410, 926, US-A 2002/0117009, or WO-A 01/90702.

Flow pickups of the described kind usually each have a non-ferromagnetic measuring tube, which is inserted fluid-tightly into the pipeline, e.g. by means of flanges or screwed connections. An electric voltage produced by charge separations in the flowing fluid by means of a magnetic field directed transversely to a flow direction of the fluid to be measured is sensed as a measured voltage by means of at least two measuring electrodes and further processed in the measuring device electronics to a corresponding, measured value, for example a measured value of volume flow rate. The part of the measuring tube contacting the fluid is, in general, electrically non-conductive, in order that the measured voltage, induced in the fluid according to Faraday's Law of Induction by the magnetic field passing, at least in part, through the measuring tube, not be short circuited. Metal measuring tubes are, therefore, usually provided internally with an electrically non-conducting liner, e.g. of hard rubber, polyfluoroethylene, etc., and are also, in general, non-ferromagnetic; in contrast, in the case of measuring tubes made completely of a plastic or a ceramic, especially aluminum oxide ceramic, the electrically non-conducting liner is not required.

In the case of magneto-inductive flow pickups, the magnetic field required for the measuring is produced by a corresponding magnetic field system, which contains a coil arrangement having an inductance L and, most often, at least two field coils, corresponding coil cores and/or pole shoes for the field coils and, as required, magnetically conductive, field-guiding sheets connecting the coil cores outside of the measuring tube. However, also magnetic field systems with a single field coil are known. The coil cores and/or pole shoes of the magnetic system are, most often, made of a soft-magnetic material. Magnetic systems with ferromagnetic coil cores have, however, also already been disclosed. The magnetic field system is usually arranged directly on the measuring tube.

For producing the magnetic field, a coil current delivered from a corresponding measuring device electronics is caused to flow in the coil arrangement. In order that the magnetic field produced by the magnetic field system be as homogeneous as possible, the field coils are, in the most frequent and simplest case, identical to one another and connected electrically in the same sense in series, so that the same exciter current can flow through both coils during operation. It has, however, also already been disclosed to cause an exciter current to flow through the coils alternately, first with the same sense, and then with opposite sense, in order, in this way, to be able to determine, for example, the viscosity of liquids and/or a degree of turbulence of the flow; see, in this connection, also EP-A 1 275 940, EP-A 770 855, DE-A 43 26 991. The aforementioned exciter current is produced by an operating electronics; it is regulated to a constant electrical current value of e.g. 85 mA, and its electrical current direction is periodically reversed. The electrical current reversal is achieved by placing the coils in a so-called T-circuit or in a so-called H-bridge circuit; on the subject of electrical current regulation and direction reversal, compare U.S. Pat. Nos. 4,410,926, or 6,031,740.

The coil current is, in the case of modern flow pickups, usually a strobed, bi-polar, rectangular, alternating current, which is positive in a first half-period of a period, with a constant, first electrical current end value and which then, by switching, is negative in a second half-period of the period, with a constant, second electrical current end value essentially equal in absolute value to that of the first electrical current end value. The coil arrangement can be e.g. a single coil, when the magneto-inductive flow pickup serves as a flow probe (compare U.S. Pat. No. 3,529,591), or it can also be composed e.g. of two coil portions, which are arranged diametrically opposite to one another on opposite sides of the measuring tube. In U.S. Pat. Nos. 6,763,729, 6,031,740 or 4,410,926, a circuit arrangement for producing such a coil current is described. This circuit arrangement includes an energy, or power, supply driving the coil current, as well as a bridge circuit, embodied as an H-bridge circuit, for modulating the coil current, with the coil arrangement lying in a transverse branch of the bridge circuit. Additionally, U.S. Pat. Nos. 6,031,740 and 4,410,926 show a circuit arrangement for producing a coil current, which, instead of the bridge circuit embodied as an H-bridge circuit, has a bridge circuit designed as a T-circuit for the coil arrangement. Furthermore, U.S. Pat. No. 4,204,240 describes a circuit arrangement with an internal energy supply for producing the coil current of a magneto-inductive flow pickup, which gives off a voltage, of which a voltage beginning value in each mentioned half-period is higher during a rising period of the coil current—as a first period portion of the half-period—than a voltage end value during a second period portion—as remainder of the half-period.

The mentioned, induced voltage arises between at least two galvanic (thus, wetted by the liquid), or between at least two capacitive (thus, e.g., embedded inside the wall of the measuring tube), measuring electrodes, with each of the electrodes sensing one potential. In the most frequent case, the measuring electrodes are so arranged lying diametrically opposite to one another that their common diameter lies perpendicular to the direction of the magnetic field and, therefore, perpendicular to the diameter on which the coil arrangements lie. The induced voltage is amplified and conditioned by means of an evaluating circuit to form a measurement signal, which is recorded, displayed, or itself processed further. Corresponding measurement electronics are likewise known to those skilled in the art, for example from EP-A 814 324, EP-A 521 169, or WO-A 01/90702.

Besides the actual measuring function, modern magneto-inductive flow meters often also include superordinated diagnosis functions, by means of which the flow meters can be subjected to a self-test during operation. Such diagnosis functions are described, for example, in the already mentioned U.S. Pat. No. 6,763,729, or EP-A 1 217 337. These self-tests can ascertain, on the one hand, whether all components of the measuring device are fully capable of performing their various functions, and, on the other hand, whether the measuring is proceeding as specified. If the result of such a self-test is positive, thus, if no malfunctions of the measuring device, or measuring operation, are present, then it is assured that the measurement result issued by the measuring device corresponds to the current, actual value, naturally, to within predetermined tolerances. Especially, individual components and parts of the measuring device can be reviewed, as to their ability to function, within the framework of such a self-test, e.g. by means of impedance measurements or measurements of ohmic resistance, or conductance, as the case may be. Furthermore, it is also possible e.g. to review the settings data at input as to plausibility. In such case, e.g. inputs lying outside of an allowable range are rejected and not transferred. Independently of the testing of the settings data at input, data calculated from the settings data, i.e. data which directly control the measuring operation of the measuring device, are checked again as to their allowed limits. This reviewing occurs before starting measuring operation, so that, in the case of an occurrence of an error with reference to the settings data, a corresponding error report can be issued and, in keeping with this, the measurement is not performed.

In the case of the measuring device described in EP-A 12 17 337, it is proposed to keep the exciter current variable in its electrical current strength, to measure the measurement voltage corresponding to the exciter current, and, on the basis of a deviation, beyond a threshold value, of the measured voltage levels, measured at various current strengths, from the voltage level expected for the measurement voltage on the basis of the functional relationship between the exciter current and the measurement voltage, a malfunctioning of the measurement operation of the measuring device can be detected. Thus, the functional relationship between the exciter current and the measurement voltage forming the basis for the measurement operation is assumed to be known and is used for the testing of the measurement operation. In the simplest case, this functional relationship between the exciter current and the measurement voltage can be linear, so that a malfunctioning of the measurement operation of the measuring device can be detected simply by a deviation of the measurement voltage levels from one another achieved at various current strengths by more than a threshold value from a linear curve.

In contrast, in the case of the flow meter described in U.S. Pat. No. 6,763,729, the testing determines, following the change of current direction, at least one parameter of the electrical current increase, and this is compared with a reference value. In such case, there is used as parameter a time span extending between two predetermined current values. Since the increase of the current satisfies a predetermined, physical law, which is, as a rule, an e-function, it is sufficient to determine the rise time between two values, in order to obtain a reliable statement concerning the electrical current increase. Alternatively, or in supplementation thereof, there can be used as parameter a time span extending between the switching of the current direction and the reaching of a predetermined electrical current value. The point in time of the switching must be determined very accurately. For example, the switching signal can be used as trigger signal for a time counter. The predetermined current value can lie, for example, in the vicinity of the maximum current value, i.e. in the vicinity of the electrical current strength, which is assumed following the settling of the magnetic field to a constant value suitable for the measuring. Additionally, in U.S. Pat. No. 6,763,729, an increased voltage is used following the switching. As already disclosed in U.S. Pat. No. 6,031,740, such an extra voltage accelerates the build-up of the magnetic field, since it increases the electrical current rise and thus makes it possible to repeat the actual measuring more quickly.

The threshold, or reference, value, in the case of the exceeding of which a malfunction of the measuring operation of the measuring device is certifiable, can be determined in the flow meter itself at an earlier point in time. For example, the desired parameter can be determined at the time of start-up and digitally stored as reference value in a microcomputer provided in the measuring electronics, so that it is available for future review procedures. In this way, each flow meter receives an individual reference value. The reference value for the deviation can be established in different ways, e.g. as a constant, absolute value. Additionally, it is possible to establish the threshold value as a percentage fraction of the measuring range end value for the measurement voltage. In this way, it can be achieved, that, by establishing the threshold value just once—namely as a percentage fraction of the measuring range end value for the initial size—a setting of the measuring device is made, which is applicable for all settable measuring ranges of the measuring device.

Once a malfunction of the measuring operation of the measuring device has been detected, various options are possible. For example, measuring operation of the measuring device can be ended, since, in such case, no further reliable measurement results can be obtained. Alternatively, or supplementally, once a malfunction of the measuring operation is detected, also optical and/or acoustical, warning reports can be issued.

Despite this method already known from the state of the art for self-test of measuring devices, there is still a need to provide other methods for self-test, with which to establish with yet greater accuracy, whether a malfunction of the measuring operation or of the measuring device itself is present. Especially, the case can arise, namely, that individual components of the measuring device only slightly deviate from their desired values, so that each individual component is noted within the framework of a self-test as fully capable of functioning, yet, in the interaction of the components, a measuring operation is generated, which is faulty, such that the stated accuracy of the measured values cannot be assured.

Moreover, it has been found that eddy currents induced in the magnet system, due to the switching and the rise of the coil current, prevent, as discussed also in U.S. Pat. No. 6,031,740, that the rise of the magnetic field exactly follows the rise of the coil current, such as would be the case in the absence of coil cores and/or pole shoes. Rather, the rise of the magnetic field is delayed and flattened, as compared with the coil current.

In the ideal case, the plot of current versus time for the current in the coil arrangement corresponds to the plot of the magnetic field versus time. Due to the eddy currents, which arise in the pole shoes and cores of the coil arrangement during the switching of the magnetic field, as a matter of fact, deviations from the ideal case occur. The coil current measured outside of the coil arrangement corresponds, therefore, to the sum of the electrical current flowing in the coil and the electrical current produced by the eddy currents. If the electrical current measured outside of the coil arrangement is used as the controlled variable, then, as a result, indeed, the current is held constant, but not the magnetic field. Such is true, so long as the eddy currents have not yet decayed.

This disadvantageous effect of the eddy currents occurs also in the case of, and despite, the mentioned increased voltage. The effect of the eddy currents can be illustrated by imagining that, connected in parallel with the (coil-) inductance, there is an eddy current source, whose current adds to the current in the inductance to make-up the total exciter current. Therefore, the voltage drop across a resistor lying in series with the inductance of the field coil is, indeed, a measure for the exciter current, but not, however, for the true field current in the inductance actually corresponding with the magnetic field. This is, however, necessary to know for an exact control of the magnetic field and, to such extent, also of advantage for the review of the magnetic field system.

SUMMARY OF THE INVENTION

It is, therefore, an object of the invention to provide a method, by means of which eddy currents can be decreased in the magnetic field system and by means of which, to such extent, a lessening of the rise time of the magnetic field, as it undergoes its rhythmic pole reversal and accompanying, repetitive, build-up anew. Additionally, an object of the invention is to provide a method with which a flow meter of the described kind can be reviewed as it is running and, to such extent, malfunctions of the measuring device can be registered very accurately and in simple manner, and, as required, can also be located.

For achieving the object, the invention resides, according to a first variant, in a method for operating a magneto-inductive flow meter having a measuring tube for conveying a fluid to be measured and having a magnetic field system, including at least one field coil carrying, at least at times, an exciter current for production of a magnetic field passing through the fluid, at least in part, perpendicularly to a stream direction. The method of the invention includes a step of changing, at a first point in time, a voltage, which, at least at times, drives the exciter current, from an instantaneous first voltage level, for example one different from zero, to a second voltage level, for example one which is constant, or controlled to be constant, in order to achieve an increase, to a maximum electrical current value, of an electrical current strength of the exciter current driven by the voltage and flowing in the at least one field coil. In such case, the second voltage level is chosen greater than the first voltage level. Additionally, the method of the invention includes a step of changing, at a second point in time, the voltage instantaneously driving the exciter current, from the second voltage level to a third voltage level, for example one which is constant or controlled to be constant, in order to achieve a sinking of the electrical current strength of the exciter current instantaneous flowing in the at least one field coil, from the maximum electrical current value to an electrical current end value, for example a constant electrical current end value, predetermined for the exciter current. In such case, the third voltage level is chosen to be smaller than the second voltage level.

Moreover, a second variant of the invention resides in a method for reviewing a magneto-inductive flow meter having a measuring tube for conveying a fluid to be measured and having a magnetic field system, which has at least one field coil, through which an exciter current flows, at least at times, for producing a magnetic field passing through the fluid at least partly perpendicularly to a stream direction. The method of the invention for reviewing the magneto-inductive flow meter includes a step of changing, at a first point in time, a voltage driving, at least at times, the exciter current, from an instantaneous first voltage level, for example one different from zero, to a second voltage level, for example one which is constant or controlled to be constant, for increasing, to a maximum electrical current value, an electrical current strength of the exciter current driven by the voltage and flowing in the at least one field coil. In such case, the second voltage level is chosen greater than the first voltage level. Additionally, the method includes a step of changing, at a second point in time, the voltage instantaneously driving the exciter current, from the second voltage level to a third voltage level, for example one which is constant or controlled to be constant, for sinking the electrical current strength of the exciter current instantaneously flowing in the at least one field coil, from the maximum current value, to an electrical current end value, for example a constant electrical current end value, predetermined for the exciter current. In such case, the third voltage level is chosen to be smaller than the second voltage level. The exciter current is additionally registered, at least at times, in order to determine a third point in time corresponding with a reaching of the electrical current end value. Based on the first, second and third points in time, a first magnetic field system time constant corresponding with a time span lying between the second point in time and the third point in time, and/or a second magnetic field system time constant corresponding with a time span lying between the first point in time and the third point in time, are/is determined. By comparing the determined first time constant with a predetermined, first reference value and/or by comparing the determined second time constant with a predetermined, second reference value, then at last one diagnosis value representing an instantaneous operating state of the flow meter is determined.

In a first embodiment of the first variant of the invention, the third voltage level is chosen to be smaller than the first voltage level.

In a second embodiment of the first variant of the invention, the voltage driving, at least at times, the exciter current is changed in such a manner that its second voltage level is essentially constant during a time span lying between the first point in time and the second point in time, for example also immediately before the second point in time.

In a third embodiment of the first variant of the invention, at least one field coil of the coil arrangement is short-circuited, at least for a time, for adjusting the voltage to the third voltage level.

In a fourth embodiment of the first variant of the invention, such further includes a step of registering the exciter current for determining a third point in time corresponding with a reaching of the electrical current end value.

In a fifth embodiment of the first variant of the invention, such further includes a step of determining a first magnetic field system time constant, which corresponds with a time span lying between the second point in time and the third point in time.

In a sixth embodiment of the first variant of the invention, such further includes a step of determining a second magnetic field system time constant, which corresponds to a time span between the first point in time and the third point in time.

A first embodiment of the second variant of the method of the invention provides that the third voltage level is chosen to be smaller than the first voltage level.

A second embodiment of the second variant of the method of the invention includes that the voltage at least at times driving the exciter current is changed in such a manner that its second voltage level is essentially constant, at least at times, during a time span lying between the first point in time and the second point in time, especially also immediately before the second point in time.

A third embodiment of the second variant of the method of the invention provides that at least one field coil of the coil arrangement is, at least for a time, short-circuited for the adjustment of the voltage to the third voltage level.

A basic idea of the invention is to lessen the rise time of the repetitively newly established magnetic field by applying a counter-voltage for a short time after the reaching of the maximum electrical current value for the exciter current and, thus, to lengthen, for example, the time span with constant exciter current, at, in comparison to conventional magneto-inductive flow meters, a half-period which remains essentially constant in length.

An additional basic idea of the invention is to use for the exciter current-, or magnetic field-, adjustment for the monitoring of the flow meter, especially of its magnetic field system, the third point in time—meant here is especially the time span measured from a suitable reference point in time—of the above-described method as an indicator depending very strongly on the instantaneous operating state of the flow meter, especially, however, on the instantaneous state of the magnetic field system, and, to such extent, reacting very sensitively to changes in the magnetic field system. The invention is based, in such case, on, among other things, the discovery that the errors in the magnetic field system have a very significant influence on the two mentioned time spans of the control for the exciter current.

BRIEF DESCRIPTION OF THE DRAWINGS

The method of the invention and further advantages will now be explained in greater detail on the basis of the timing diagrams and schematic circuit diagrams for a magneto-inductive flow meter illustrated in the drawing, the figures of which show as follows.

DESCRIPTION OF THE PREFERRED EMBODIMENTS

Figure 1:
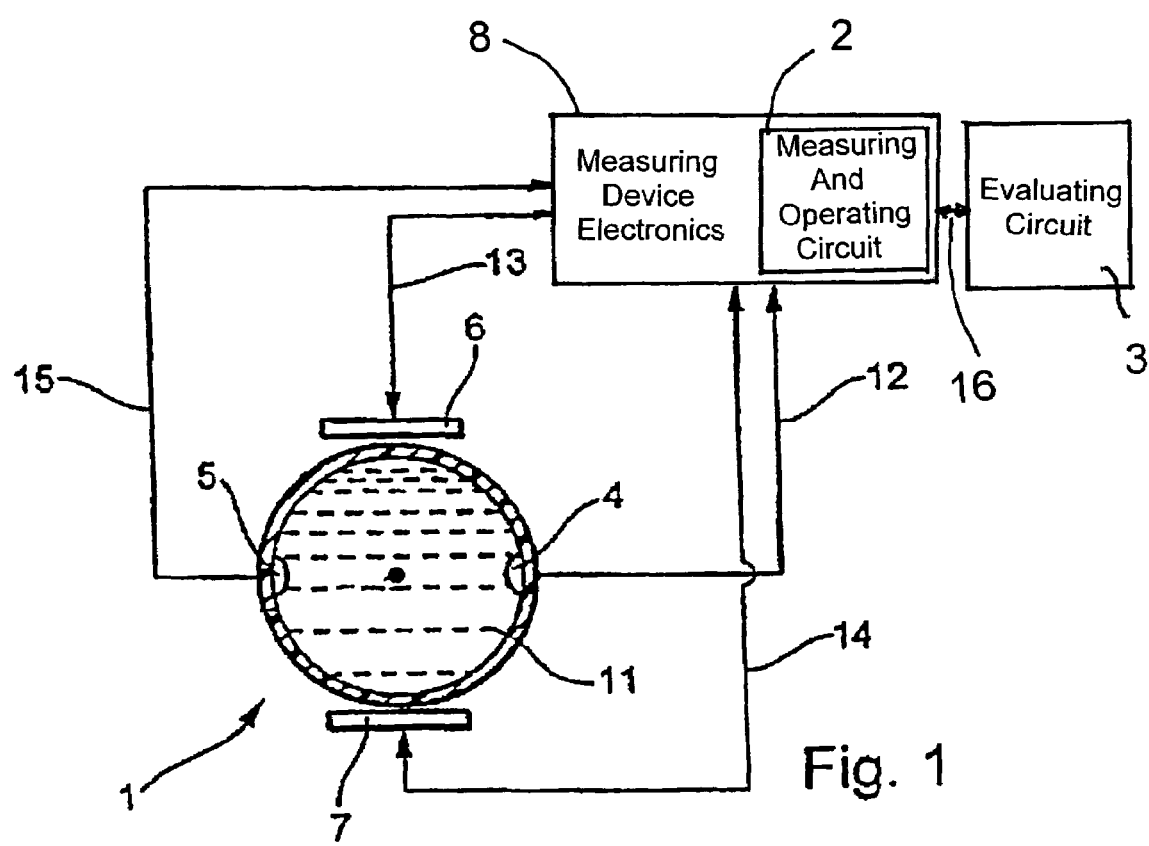
FIGS. 1 and 2 respectively, show schematically and in the form of a block diagram, a process measuring device—here in the form of a magneto-inductive flow meter—suitable for performing the method of the invention.

FIG. 1 shows schematically and partially in the form of a block diagram a magneto-inductive flow meter suitable for carrying-out the method of the invention. By means of this flow meter, measured values can be produced for at least one physical variable of a medium, especially a fluid, flowing in a pipeline (not shown). For example, the flow meter can be used for measuring a volume flow rate and/or a flow velocity of an electrically conducting liquid.

The flow meter shown here includes a flow pickup 1 for producing measured potentials corresponding to the physical variable to be measured, a measuring device electronics 8 having a microcomputer, especially a measuring and operating circuit 2, especially one implemented, at least in part, by means of the microcomputer, for registering the measuring potentials and for producing at least one measurement signal corresponding with the physical variable, as well as an evaluating circuit 3, especially one realized by means of the microcomputer, serving for actuating the measuring and operating circuit 2 and, thus, also the flow pickup 1, and for producing the measured values representing the physical variable on the basis of the at least one measurement signal. The measuring and operating circuit 2 and, as required, also some components of the flow pickup 1 can be accommodated, for example, in an electronics housing 10 of the flow meter, as also indicated schematically in FIG. 2.

Belonging to the flow pickup 1 is a measuring tube 11 insertable into the course of the mentioned pipeline. Measuring tube 11 has a tube wall. The fluid to be measured is allowed to flow through measuring tube 11 during operation, in the direction of a measuring tube longitudinal axis.

For preventing a short-circuiting of voltages induced in the fluid, an internal part of the measuring tube 11 contacting the fluid is electrically non-conducting. Metal measuring tubes are, for such purpose, usually provided internally with an electrically non-conductive lining e.g. of hard rubber, polyfluoroethylene, etc., and are also, in general, non-ferromagnetic; in the case of measuring tubes made completely of plastic or ceramic, especially aluminum oxide ceramic, this electrically non-conducting layer is, in contrast, not required.

A coil arrangement of a magnetic field system of the flow meter actuated by a driving electronics 21 provided in the measuring and operating electronics 2 includes, in the illustrated example of an embodiment, a first field coil 12 arranged on the measuring tube 11 and a second field coil 13 arranged on the measuring tube 11. The field coils 12, 13 lie on a first diameter of the measuring tube 11. The magnetic field system serves for producing, in cooperation with the measuring device electronics, a magnetic field B passing through the tube wall and the fluid flowing through the measuring tube 11. This arises, when an exciter current I is caused by the driving electronics 21 to flow in the field coils 12, 13 connected, in the case shown here, in series. The exciter current I, especially a bi-polar exciter current I, can, in such case, be e.g. essentially rectangular or at least have a waveform resembling a rectangular waveform.

Figure 3:
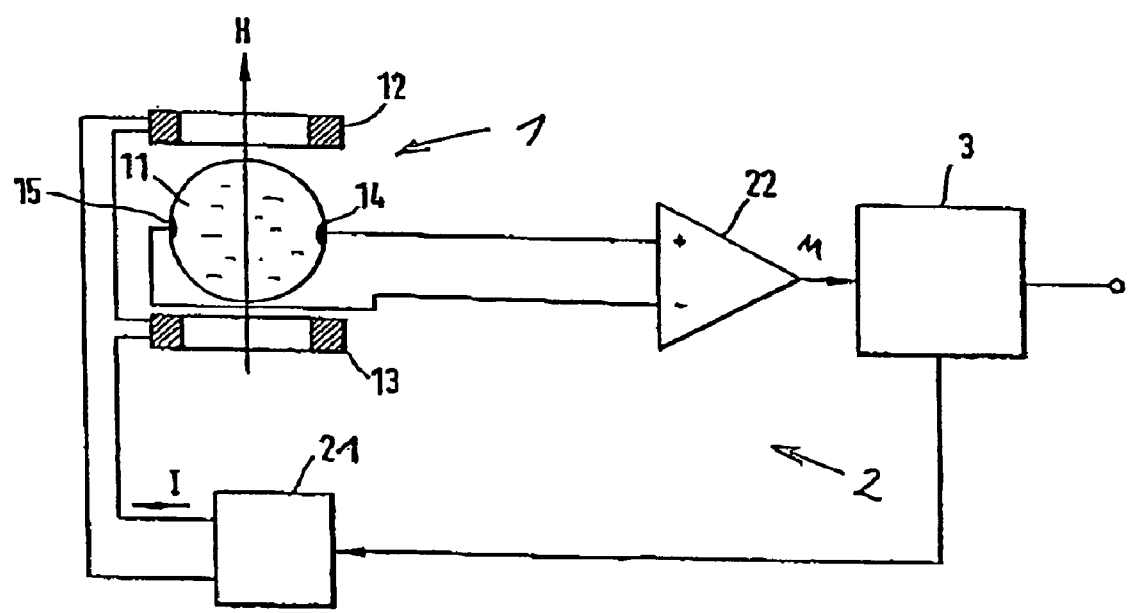
FIG. 3 shows schematically, a timing diagram of an exciter current flowing during operation of the process measuring device of FIGS. 1 and 2.

FIG. 3 shows that the field coils 12, 13 do not contain cores and are, thus, so-called air-coils. The field coils 12, 13 can, however, as usual in such coil arrangements, be wound on a core, which is, in general, magnetically soft, wherein the cores can interact with pole-shoes; compare e.g. U.S. Pat. No. 5,540,103.

The coil arrangement shown in this example of an embodiment is, here, so embodied, especially the two field coils 12, 13 are so formed and dimensioned, that the magnetic field H produced therewith within the measuring tube 11 is, at least with reference to a second diameter perpendicular to the first diameter, symmetrical, especially rotationally symmetrical.

In an embodiment of the invention, a direct current, especially one controlled to have a constant amplitude, is produced by means of the driving electronics 21. This direct current is then periodically reversed by means of an appropriate switching mechanism, for example one configured as an H-, or T-, circuit, and, so, modulated into an alternating current of controlled amplitude. As a result of this, thus, the exciter current I is so allowed to flow through the coil arrangement, that the coils 12, 13, as schematically illustrated in FIG. 3, have current flowing through them in a first flow direction during a first switch phase PH11 and in an opposite direction reversed with respect to the first current direction during a second switch phase PH12; compare, regarding control and reversal of the electrical current, e.g. also U.S. Pat. Nos. 4,410,926 or 6,031,740.

Following on the second switch phase PH12 is a third switch phase PH21, during which the exciter current I flows again in the first current direction. Following on the third switch phase is a fourth switch phase PH22, during which the exciter current again flows in the opposite direction. Following on this is a corresponding switch phase PH31, etc. Regarding the reversal of direction of the exciter current I, in each case, two switch phases, one following the other, form a switching period P1, P2, P3, etc. Accompanying the pole reversal of the exciter current I flowing through the coil arrangement, aside from a possible switch-phase shifting essentially synchronously thereto, also there is a repeated pole reversal of the magnetic field H; compare, in this connection, FIG. 3.

For producing at least one electrical measurement signal corresponding with the measured variable, a sensor arrangement is additionally provided in the measurement pickup, arranged on the measuring tube or at least in its vicinity. In an embodiment of the invention, the sensor arrangement has electrodes applied essentially directly on the measuring tube. A first electrode 14 arranged on an inner side of the tube wall of the measuring tube 11 serves, in such case, to sense a first potential $e_{14}$ induced by the magnetic field H. An electrode 15 arranged in the same manner serves additionally for the sensing of a second potential $e_{15}$ induced by the magnetic field. The measuring electrodes 14, 15 lie on the second diameter of the measuring tube 11, with the second diameter being perpendicular to the first diameter and to the longitudinal axis of the measuring tube. Electrodes 14, 15 can, however, also lie on a chord of the measuring tube 11 parallel to the second diameter; compare, in this respect, also U.S. Pat. No. 5,646,353.

FIG. 1 shows the measuring electrodes 14, 15 to be galvanic measuring electrodes, thus electrodes which contact the fluid. It is possible, however, also to use two capacitive measuring electrodes, thus electrodes arranged e.g. within the wall of the measuring tube 11. Each of the measuring electrodes 14, 15 senses its electric potential $e_{14}$, $e_{15}$, as such is induced, during operation, in the fluid flowing through the measuring tube, on the basis of Faraday's law.

Figure 2:
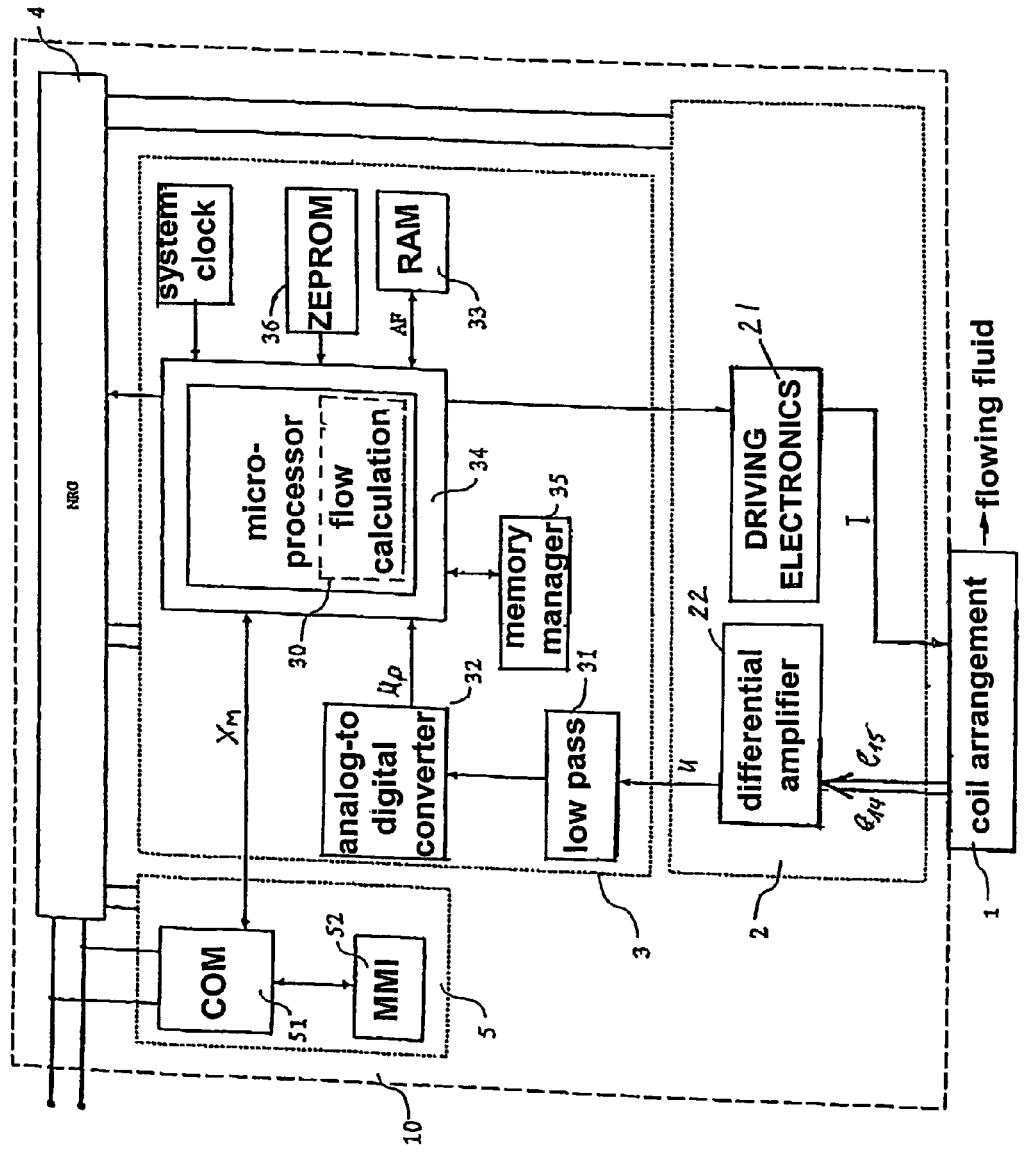

As shown in FIG. 2, the measuring electrodes 14, 15 are connected during operation, at least at times, respectively with an inverting and a non-inverting input of a differential amplifier 22. Therefore, a potential difference of the two potentials $e_{14}$, $e_{15}$ sensed by the measuring electrodes 14, 15 is formed to serve as measurement signal u, this potential difference corresponding to a voltage arising in the fluid flowing through the measuring tube and, thus, also to the physical variable to be measured. The potentials $e_{14}$, $e_{15}$ lying on the measuring electrodes 14, 15 are, usually, in the range of 10 mV to 100 mV. It is to be noted here, however, that the potentials can, however, be sensed also over separate measuring channels, and, especially, they can also be separately digitized; compare, in this connection, also U.S. Pat. No. 5,907,103. The measurement signal u present on the output of the differential amplifier 22 in the example of an embodiment shown here is, as schematically indicated in FIGS. 1, 2, supplied to the evaluating circuit 3 provided in the flow meter.

Figure 4:
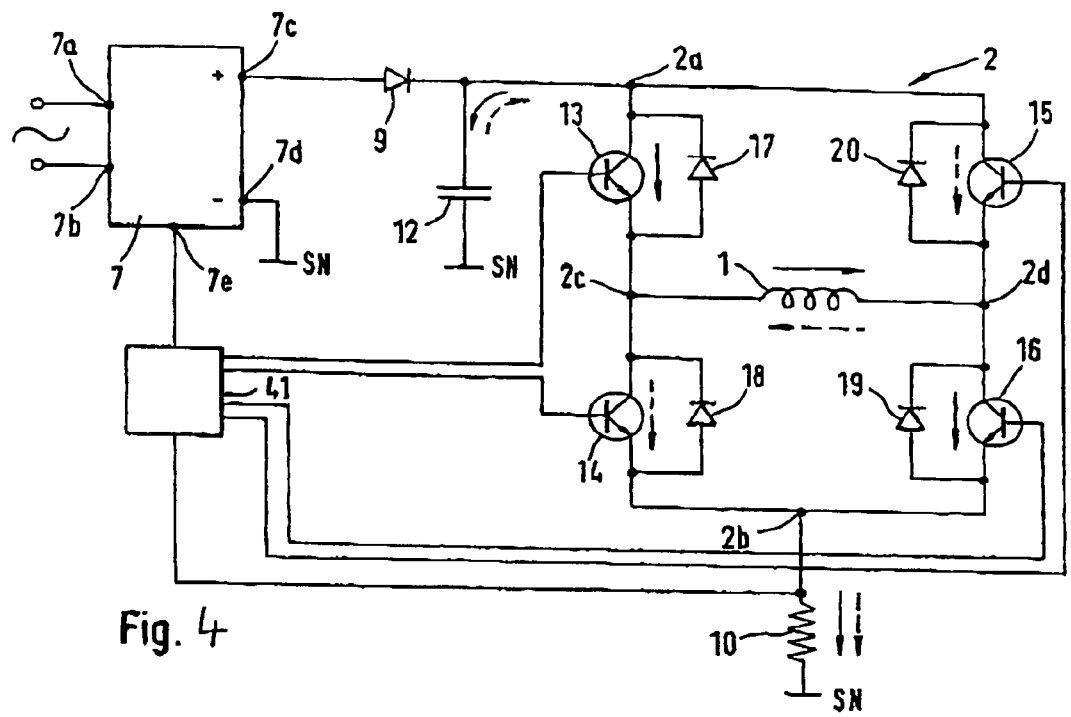
FIG. 4 is a schematic circuit diagram of a first example of an embodiment, having an H-bridge circuit.

FIGS. 3 and 4 concern examples of embodiments for a switching mechanism based on an H-bridge circuit. Lying in a first branch of the bridge is the controlled current path of a first transistor 13, in a second bridge branch the controlled current path of a second transistor 14, in a third bridge path the controlled current path of a third transistor 15 and in a fourth bridge branch the controlled current path of a fourth transistor 16. This structure yields four corner points 2a, 2b, 2c, 2d of the H-bridge circuit: The transistors 13, 14 are connected together by the corner point 2c, the transistors 14, 16 by the corner point 2b, the transistors 15, 16 by the corner point 2d and the transistors 13, 15 by the corner point 2a. A first bridge diagonal lies between the corner points 2a, 2b and a second bridge diagonal lies between the corner points 2c, 2d. In the second bridge diagonal, a coil arrangement 1 of a magnetic filed system of the flow pickup is provided. Coil arrangement 1 includes at least one field coil. In other words, first and second terminals of the coil arrangement are connected, respectively, with the corner points 2c and 2d.

In operation of the switching arrangement, interacting with the coil arrangement as a rectangular modulator, either the first and fourth transistors 13, 16, or else the second and third transistors 14, 15, are driven simultaneously into a conductive state. Therefore, in the first case (transistors 13, 16 conducting), an assumed-positive current flows from corner point 2a to corner point 2b, through the coil arrangement 1 and in the direction indicated by the solid arrow. If, in contrast, the transistors 14, 15 are conducting, then the same current flows in the reverse direction through the coil arrangement 1, this being illustrated by the dashed arrow.

The coil arrangement 1 has an inductance L and is part of a magnet system producing a magnetic field of a magneto-inductive flow pickup. The entire flow pickup is not shown, since the mechanical construction of such pickups is long known to those skilled in the art; compare the above-cited U.S. Pat. No. 4,204,240. Of interest for the invention is only that the magnet system includes a coil core and/or a pole shoe.

As is likewise long known to those skilled in the art, the exciter, or coil, current is so produced by the discussed, alternating conductive states of transistors 13, 16, or 14, 15, that it is positive in the first half-period of the duration of a period, with a constant first current end value, and negative in its second half-period, with a constant second current end value, which is equal in absolute value to the first current end value. The current end value refers to that constant value of the coil current, e.g. 85 mA, which is flowing before the switching to the other electrical current direction.

The end point 2c is connected in FIG. 3 via a resistor 10 to a circuit ground, or zero point, SN. Resistor 10 is in series with the H-bridge circuit 2 and the coil current flows through resistor 10.

Additionally shown in FIG. 3 is a controlled voltage source 7, which has a voltage output 7c and provides a voltage (here assumed positive, as indicated by the plus sign at the output 7c) lying across the series connection, thus between corner point 2a and the circuit ground SN. The controlled voltage source 7 is fed by the alternating current supply of the plant, via the two terminals 7a, 7b; additionally, output 7d of source 7 is connected to circuit ground SN. The voltage at output 7c is applied through diode 9, in the direction from anode to cathode, to the corner point 2a. A capacitor 12 of capacitance C leads from the cathode of diode 9 and the corner point 2a to circuit ground SN.

In FIG. 4, the sequence of coil arrangement and resistor is reversed in the series connection: The corner point 2b of the H-bridge circuit 2 now lies at circuit ground SN, while the resistor, in the form of resistor 10', is, in such case, located between the output 7c of the controlled voltage source 7 and the anode of diode 9. This yields the advantage that a possible short circuit between the corner points 2c, 2d, thus e.g. in the coil arrangement 1, cannot destroy the transistors 13, 16, or 14, 15 (depending on which pair happens to be conducting), since the coil current is limited by the resistor 10'.

Figure 5:
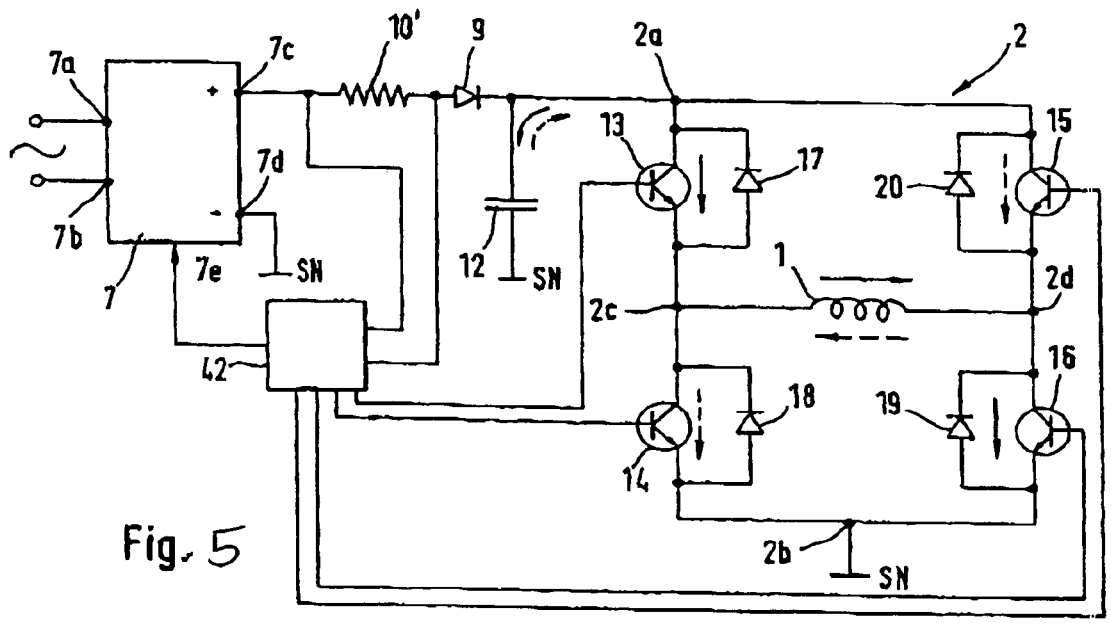
FIG. 5 is a schematic circuit diagram of a second example of an embodiment, having an H-bridge circuit.
Figure 6:
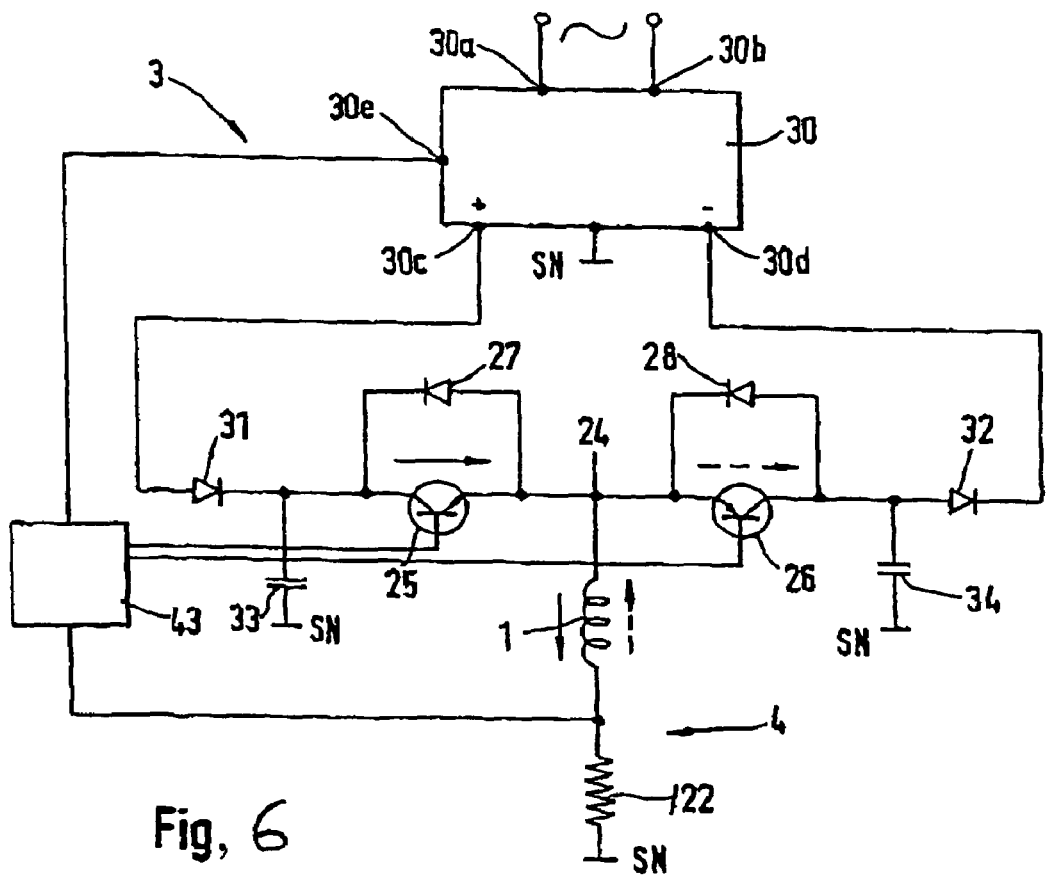
FIG. 6 is a schematic circuit diagram of a first example of an embodiment, having a T-circuit.

FIGS. 5 and 6 concern examples of embodiments using T-circuits 3 and 3' respectively. A resistor 122, respectively 122', forms with the coil arrangement 1 a series connection 4, respectively 4'. This is, in the case of the circuit of FIG. 3, so constructed, that the coil arrangement 1 is connected through resistor 122 to circuit ground SN, and the coil current flows through the coil arrangement 1. In contrast, in FIG. 4, the first terminal of the series connection 4' is connected to the circuit ground SN.

A first terminal of the controlled current path of a first switching transistor 25 is connected with a second terminal of the series connection 4, 4'. A second terminal of this current path is connected to a first output 30c of a controlled voltage source 30, which determines a positive (note the plus sign on output 30c) voltage lying across the series connection. A first terminal of the controlled current path of a second switching transistor 26 is connected with the second terminal of the series connection 4, 4'. A second terminal of this current path is connected to a second output 30d of the controlled voltage source 30, which determines a negative (note the minus sign on the output 30d) voltage lying across the series connection. The switching transistors 25, 26 are alternately driven to be conductive, so that the coil current alternately reverses its direction, as indicated by the two arrows on the coil arrangement 1. Also here, the coil current is positive in the first half-period of a period, with a constant electrical current end value and negative in its second half-period, with a constant, second electrical current end value, which is equal in absolute value to the first electrical current end value.

In FIGS. 5 and 6, the positive voltage at output 30c of the voltage source 30 is applied to the second terminal of the switching transistor 25 through a first diode 31 in its direction from-anode-to-cathode. Additionally, a capacitor 33 of capacitance C1 leads from this terminal and from the cathode of the diode 31 to the circuit ground SN. The negative voltage at output 30d of the voltage source 30 is applied to the second terminal of the switching transistor 26 through a second diode 32 in its direction from-cathode-to-anode. Additionally, a second capacitor 34 of capacitance C2 leads from this terminal and from the cathode of diode 32 to the circuit ground SN.

In the examples of embodiments presented in FIGS. 3 and 4 and FIGS. 5 and 6, the mentioned inductance L of the coil arrangement 1 forms a resonance circuit with the capacitance C of the capacitor 12, or with the capacitances C1 and C2, as the case may be. This means that the voltage across the series connection is resonance-reinforced, and the coil current during a rise at the beginning of every half-period has a steeper rising edge than would be the case, if the resonance circuit were not present.

For the digitizing: A measurement signal u is preferably digitized and at least a section thereof appropriately stored in the form of digital data sets, so that, for determining also the diagnosis value, information concerning the time behavior of a section of the measurement signal u is available in digital form.

According to the invention, the evaluating circuit 3 also serves for producing a diagnosis value serving for review of the magneto-inductive flow meter. The diagnosis value represents an instantaneous operating state of the flow meter, especially, however, an instantaneous operating state of the magnetic field system. For example, the diagnosis value can be used to generate an appropriate alarm, when, on the basis of deviations of the diagnosis value from a corresponding, earlier determined reference, or threshold, value, a defective magnet system has been recognized. Such defects can be e.g. vibration-related fractures of electrical lines and/or loosenings of the assembled elements of the magnetic field system. Moreover, significant, especially shock-like, fluctuations of the fluid temperature can also lead to thermally related disturbances of the magnetic field system or, at least, to changes regarding the calibration of the magnetic field system.

For this purpose, the voltage source in the illustrated example of an embodiment is, as also already described in U.S. Pat. No. 6,031,740, first so controlled, that it produces in each half-period during a first fractional period of the coil current, which is referred to in the following as the rise time period $t_{rev}$, an initial voltage value $U_{drv}$, which is higher, e.g. several times higher, than a constantly controlled voltage end value $U_{cont}$ during a second fractional period, which is referenced in the following at the residual time period tc; compare FIGS. 5a and 5b. Additionally, the voltage drop across resistor 10, 10', or 22, 22', as the case may be, is used to compensate an effect of eddy currents, which are induced in the coil cores and/or pole shoes during the rise of the coil current and which delay the rising edge of the magnetic field compared to the rising edge of the coil current. This is achieved by influencing, or controlling, during each half-period, the rise time period $t_{rev}$ of the coil current and the level of the positive, or negative, voltage end value $U_{cont}$ in such a manner that, on the one hand, following the reaching of an electrical current maximum Im, no further increase of the coil current occurs, so that the magnetic field already reaches a constant magnetic field end value $B_m$ corresponding to the constant electrical current end value of the coil current, when the coil current reaches the electrical current maximum Im (compare FIG. 5a), and that, on the other hand, the level of the positive, or negative, voltage end value $U_{cont}$ always brings-about the constant electrical current end value Ic of e.g. 85 mA. This is achieved by forming a correction for the voltage across the H-bridge circuit, or T-circuit in the next half-period from the waveform of the voltage drop across the resistor arising during a half-period in the time span after the electrical current maximum Im of the coil current until the reaching of the electrical current end value, by sampling at least three times, one after the other.

In FIGS. 3 to 6, the transistors 13, 14, 15, 16 of the H-bridge circuit, and the switching transistors 25, 26 of the T-circuit, are always shown with non-connected control electrodes. This is merely a showing that the activation of these transistors is adequately described in the state of the art, e.g. in the above-mentioned U.S. Pat. No. 4,410,926, so that those skilled in the art know what needs to be actuated and how to do that. Additionally, the controlled current paths of the transistors 13, 14, 15, 16 and of the transistors 25, 26, are bridged with free-wheeling diodes 17, 18, 19, 20, and 27, 28. The transistors are shown as bipolar transistors; however, naturally, also field effect transistors can be used, especially insulating-layer field effect transistors.

FIG. 5a is a plot, over an entire period, of coil current I and induction B of the magnetic field in the ordinate direction versus time as abscissa. In the first half period with positive coil current I, it is indicated that the duration of the half period is composed of a time of rise ta and a residual time tc; the residual time is that in which the induction B of the magnetic field is constant. During the rise time $t_{rev}$, the coil current IM, on the one hand, rises sharply, then falls again, after reaching an electrical current maximum Im and reaches, later than the induction B, its constant current end value Icont; compare the only gradual fall of the coil current after the electrical current maximum Im. This behavior of the coil current is attributable to the above-explained eddy currents induced in the coil cores and/or the pole shoes. The point in time of the reaching of the electrical current maximum Im determines the boundary line between the rise time $t_{rev}$ and the residual time $t_{cont}$. During the rise time $t_{rev}$, on the other hand, the induction B first rises almost with slope identical to that of the coil current, but the rise then becomes flatter later and reaches, already at the end of the rise time ta, the intended, constant, induction end value $B_m$.

The arrows drawn above the curve of the coil current during its falling part of the residual time $t_{cont}$ indicate that the course of the coil current is sampled at least three times, e.g. every millisecond, before it reaches the electrical current end value $I_m$; in the example of FIG. 5a, the falling part of the coil current is sampled four times. From the sample values, according to the invention, the control signal for the controlled voltage source is produced, as is yet to be explained in detail.

FIG. 5b is a plot of the effective voltage, in the ordinate direction, on the series connection with the H-bridge circuit or with the T-circuit versus time t as the abscissa. The first peak Us is attributable to resonance reinforcement in the coil arrangement. The constant value following thereon is the mentioned voltage initial value $U_{drv}$, which contributes to the steepening of the rise of the coil current. Without voltage reinforcement, only the voltage initial value Ua would be present during the entire rise time $t_{rev}$. During the residual time $t_{cont}$, the constant voltage end value $U_{cont}$ comes into the picture. It can be seen from FIG. 5b that, as was already mentioned, the voltage initial value $U_{drv}$ is larger than the voltage end value $U_{cont}$.

FIGS. 3 to 6 illustrate the control of the controlled voltage source 7, or 30, by a controller 41, or 42, or 43, or 44, situated between the resistor 10, or 10', or 122 or 122' and a control input 7e, or 30e, of the controlled voltage source 7, or 30. Additionally, the relevant controller controls the transistors 13, 14, 15, 16 of the H-bridge circuit, or the switching transistors 25, 26 of the T-circuit. The controller 41, or 42, or 43, or 44 is at least partly implemented by the already mentioned, appropriately programmed microcomputer, or microprocessor. Connected in front of this is an analog/digital converter, which digitizes the voltage drop across the resistor 10, or 10', or 122, or 122'. Microprocessor and analog/digital converter are, of course, clocked, or strobed, by a clock oscillator.

In the case of the method of the invention, first, similarly to the case with the flow meter described in U.S. Pat. No. 6,763,729 or in U.S. Pat. No. 6,031,740, the voltage $U_H$ driving, at least at times, the exciter current $I_M$, is, at a first point in time $t_1$ raised from an instantaneous first voltage level $U_{cont}$ different from zero and present in the preceding half-period, to the, especially constant, or controlled to be constant, second voltage level $U_{drv}$, for the purpose of increasing the current strength I of the exciter current $I_M$, driven by the voltage and flowing in the at least one field coil, to the maximum current value $I_m$.

As already mentioned, the coil current $I_M$ flowing during the time span $t_{cont}$ is at least sectionally sampled, digitized and stored appropriately in the already mentioned microcomputer. The measured and digitally stored electrical current values can now, without more, be used for calculating the voltage profile, towards which the voltage driving the exciter current $I_M$ should be adjusted in the future for the next half-period of the magnetic field B. Thus, in effect, an approximation method performed iteratively or recursively over a plurality of measurement cycles is being applied. The extra voltage $U_{drv}$ lying on the coil arrangement during the time span $t_{rev}$ is successively so tuned from half-period to half-period, or from measuring cycle to measuring cycle, that the coil current $I_M$ during the remaining time span $t_{cont}$ of any half-period steadily falls toward a constant electrical current end value $I_c$. Thus, attention is given to assuring that the time span $t_{rev}$ during which the extra voltage $U_{drv}$ is applied to the coil arrangement is so selected that the measured coil current $I_M$ no longer increases during the time span $t_{cont}$. If there is a rise, then this is an indication that the time span $t_{rev}$ was chosen too short. As a result of this, the measuring and operating circuit 2 increases the time span $t_{rev}$ during the following half-periods by suitable amounts, until the measured exciter current $I_M$ exhibits the desired behavior.

Figure 7:
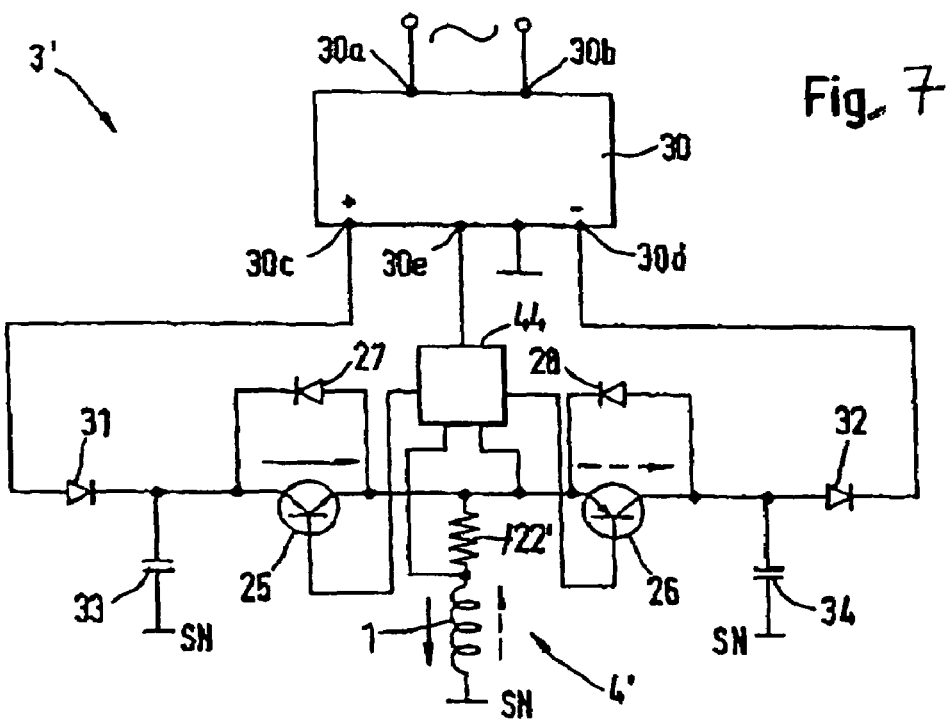
FIG. 7 is a schematic circuit diagram of a second example of an embodiment, having a T-circuit.
Figure 8:
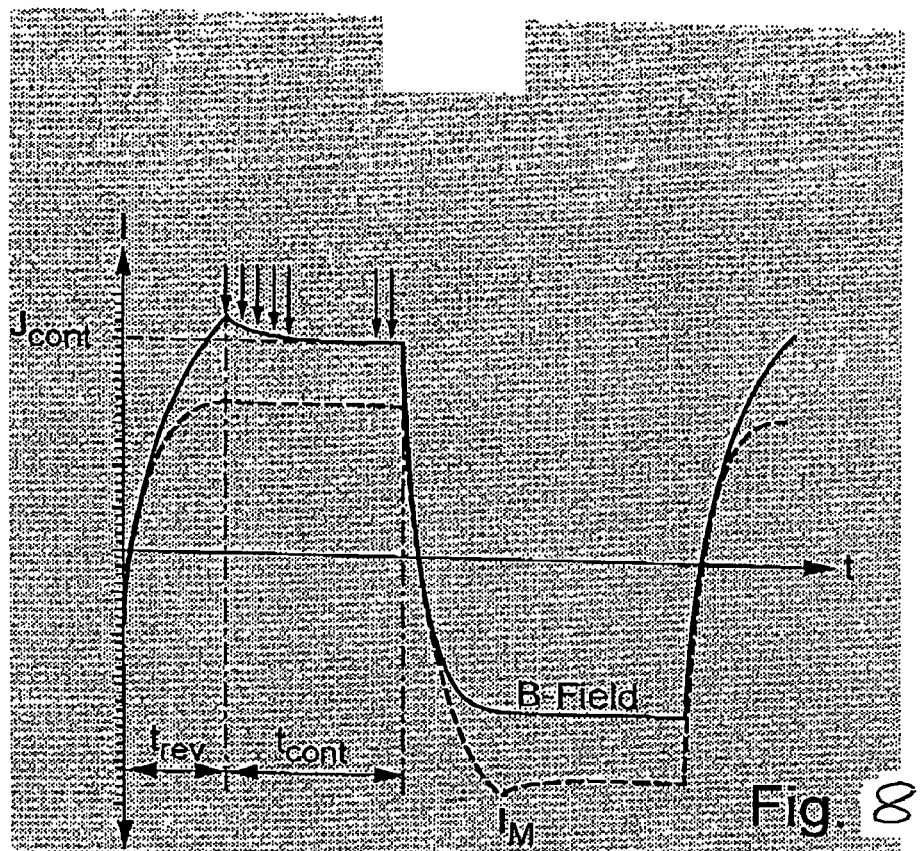
FIG. 8 shows waveforms of the coil current and magnetic induction, or voltage of the voltage source.

The microcomputer can be programmed, for example, corresponding to the flow diagram shown in FIG. 7, in which suitable function and decision blocks are illustrated. Lower-case letters represent digital signals important for the flow diagram. By means of the already mentioned analog/digital converter, the voltage drop across the resistor is digitized, so that a digital signal i representing the coil current results. This is supplied to the input of a maximum detector 61 and to the input of a gate stage, which is also fed with a maximum signal im coming from the maximum detector 61. The gate stage 62 forwards as current samples s only such portions of the digital signal i representing the coil current, which occur later than the occurrence of the signal maximum.

A first decision stage 63 reviews sequentially following, neighboring electrical current samples s under the criterion of whether the later sample is greater than the earlier, thus whether the coil current has increased between two samples, and issues, when appropriate, a control signal y at a YES-output Y and, when not appropriate, a control signal n at a NO-output N. The control signal y prompts a pulse length stage 64 to lengthen the rise time ta, and the control signal n prompts the pulse length stage 64 to lengthen the residual time $t_{cont}$. An output of the pulse length stage leads to the voltage source 7, or 30, as the case may be.

A second decision stage 65 continuously reviews the current samples s under the criterion of whether a current sample s is greater than, equal to, or smaller than an electrical current reference value ir, which is proportional to the current end value $I_{cont}$, and registers such.

Depending on its decision, decision stage 65 issues at a GREATER-output G a control signal g, at an EQUAL-output a control signal gI, or at a SMALLER-output K a control signal k. These control signals g, gI, k are supplied to the voltage source 7, or 30 (if required, with interposition of a digital/analog converter) and affect the voltage initial value Ua issued therefrom in the duration of a period of the coil current in such a manner that the control signal g makes it larger in the following period, the control signal gI leaves it unchanged in the following period, or the control signal k makes it smaller in the following period.

During the actual measurement of the volume flow rate, both the voltage across the coil arrangement and the exciter current $I_M$ flowing through the coil arrangement must be constant, since the stability of the measurement signal is negatively influenced by, among other things, also the inductive in-coupling of the coil arrangement onto the measuring electrodes.

Ideally, the electrical current end value of the true coil current $I_L$ is, in both half-periods, essentially constant, opposite, and equal in absolute value. From a practical point of view, this is, however, first the case in U.S. Pat. No. 6,763,729, or U.S. Pat. No. 6,031,740, only after a considerable length of time has passed-by following the beginning of the time span $t_{cont}$. Therefore, the time window for possible exact measurements during the time span $T_{cont}$ is essentially limited almost to just half of a half-period. Due to the eddy currents arising in the pole shoes and coil cores, this ideal case does not really occur. Rather, the exciter current $I_M$ measurable outside of the coil arrangement corresponds always to a sum of currents composed of the true coil current $I_L$ and the eddy current $I_{eddy}$. Since, however, only the exciter current is used by the measuring and operating circuit 2 as the controlled variable, indeed the exciter current $I_M$ is constant, however not, as a matter of course, the magnetic field, which is passing through the measuring tube and which really needs to be kept constant for the measurement.

Figure 9:
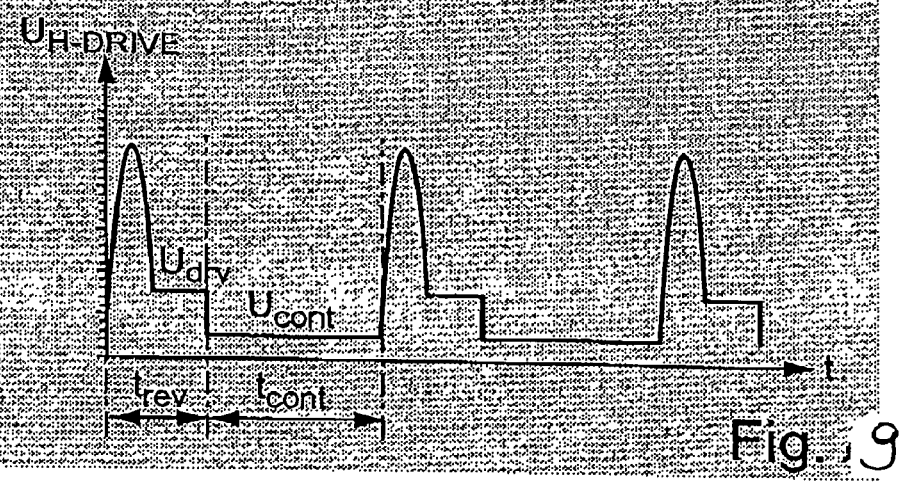
FIG. 9 is a flow diagram of a microprocessor used for the invention.
Figure 10:
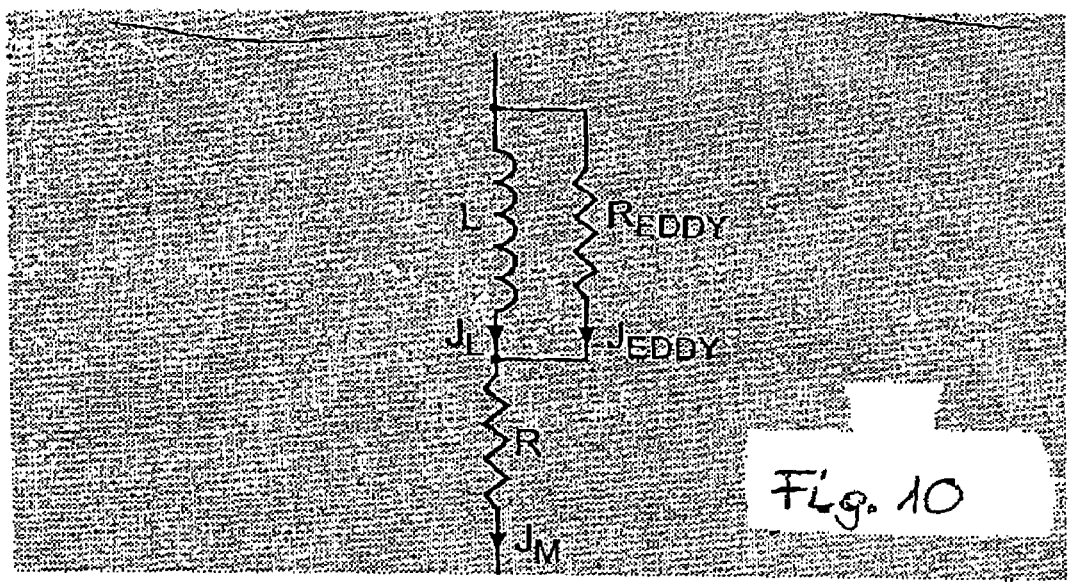
FIG. 10 is a graphic illustration of the waveform of the coil current and of the magnetic field in the case of the solution known from the state of the art.
Figure 11:
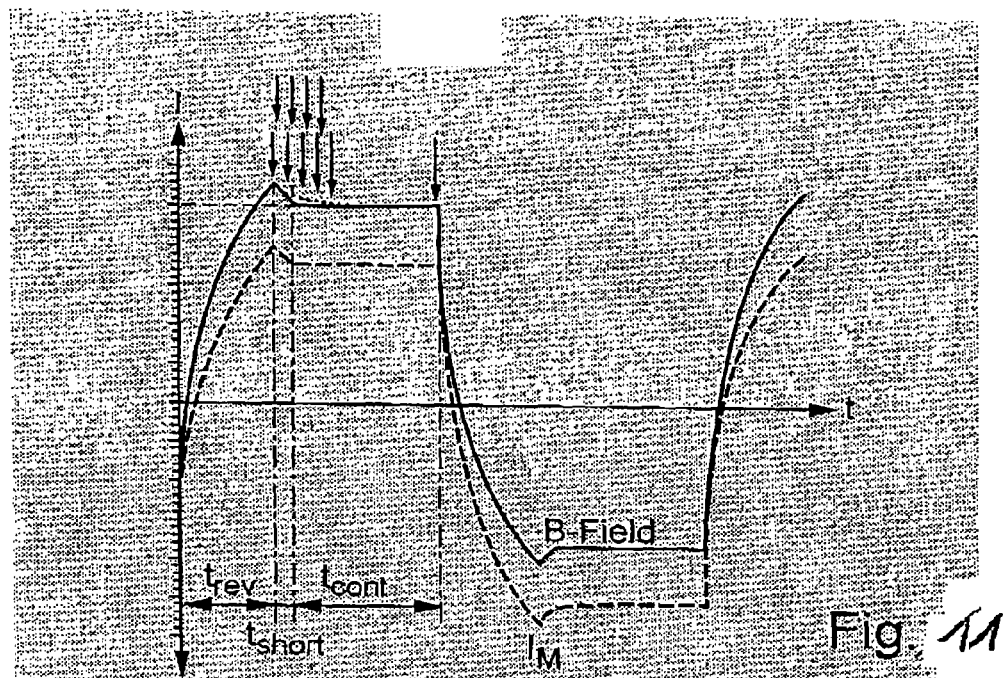
FIG. 11 is a graphic illustration of the waveform of the voltage lying on the coil arrangement in the case of the solution known from the state of the art.
Figure 12:
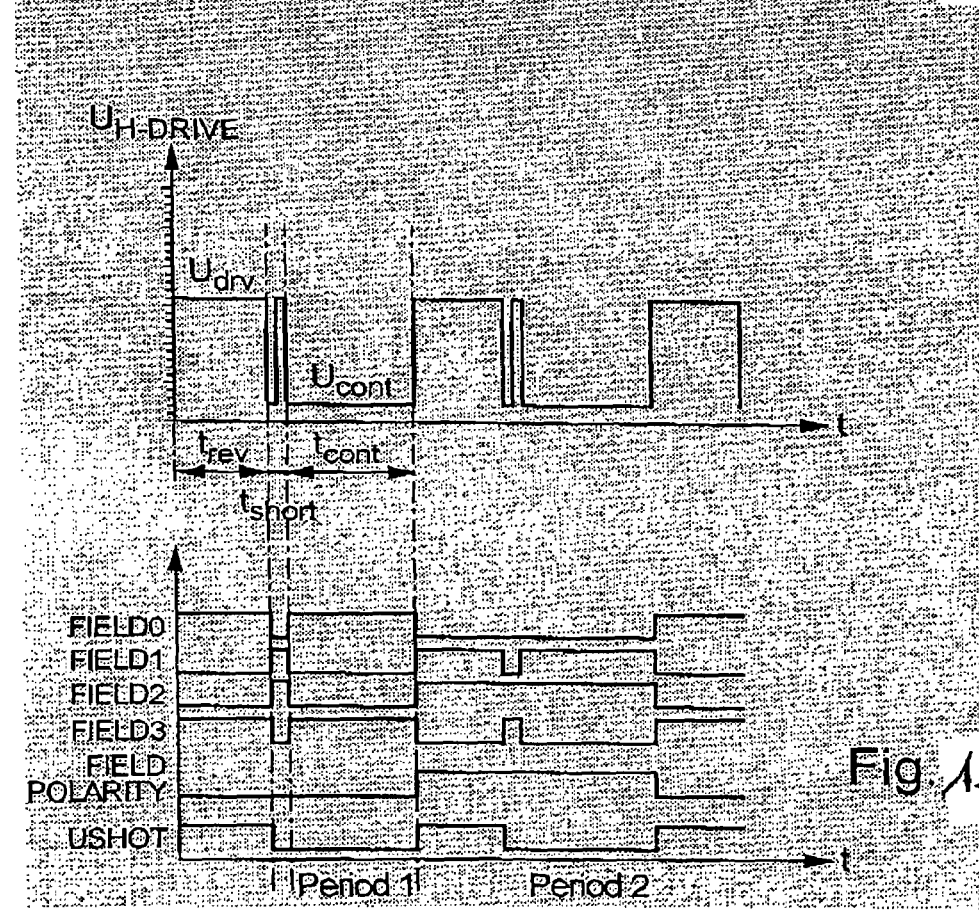
FIG. 12 is a graphic illustration of the waveform of the voltage lying on the coil arrangement in the case of the apparatus of the invention.
Figure 13:
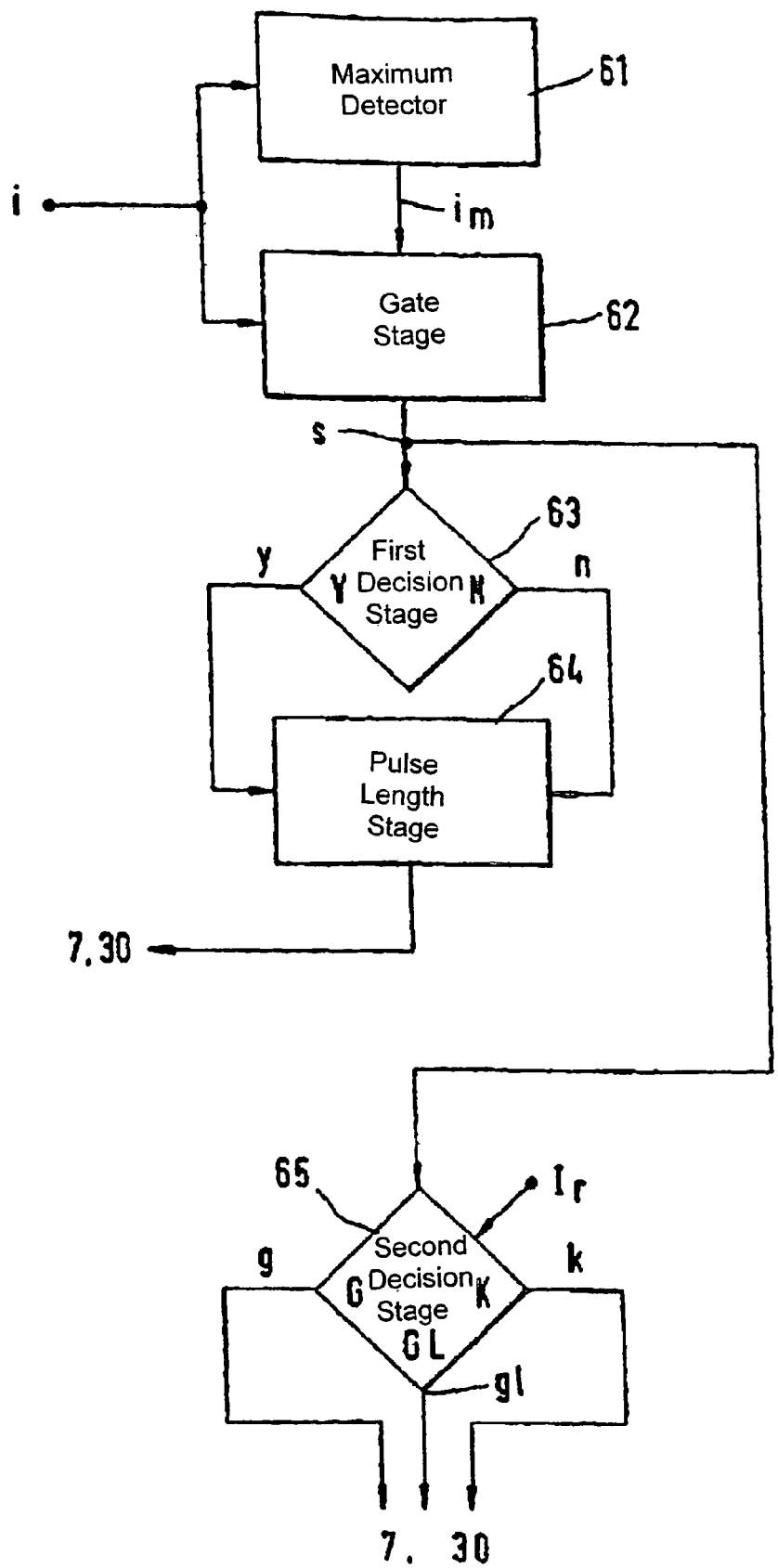
FIG. 13 is a graphic illustration of the waveform of the coil current and the waveform of the magnetic field in the case of the apparatus of the invention.

In the case of the method of the invention, the eddy currents induced in the magnetic field system are further minimized in advantageous manner not only by the application of an extra voltage $U_{rev}$ to the coil arrangement for the initially determined reference time span $T_{rev}=t_2-t_1$ until the reaching of the predetermined current maximum $I_m$, wherein the extra voltage is so selected that the exciter current $I_M$ flowing through the coil arrangement falls, after expiration of the reference time span $T_{rev}$, steadily toward an essentially constant end value $I_c$, but also by applying to the coil arrangement 1, following the, first of all, at least approximately determined expiration of the reference time span $T_{rev}$, for a predetermined, especially equally iteratively determined, time span $T_{short}=t_3-t_2$, a counter voltage $U_{short}$ for sinking the exciter current $I_M$ and, therefore, also the magnetic field back down more quickly, wherein the time span $T_{short}$ is so selected that the influence of the eddy currents induced during the switching procedure in the coil arrangement is approximately compensated, at least, however, considerably reduced. The effect of this method is shown in FIG. 9, wherein the continuous line indicates the course of the measuring current, as it forms in the case of the solution of the invention; in contrast, the dotted line shows the time behavior of the exciter current in the case of the solution known from the state of the art. In the case of the solution of the invention, the constant electrical current end value $I_{cont}$ is essentially reached at the expiration of the time span $T_{short}$; in the case of the known solution, the constant electrical current end value Icont is first reached at a much later point in time within the time span $T_{cont}$. During a first switching procedure, the measuring and operating circuit applies, as already explained above, an appropriate counter voltage $U_G$ to the coil arrangement for an ongoingly predetermined time span $T_{short}$. Then, the measuring and operating circuit registers a plurality of electrical current measured values within the predetermined time span $T_{cont}$. For example, both the time span $T_{rev}$ and the time span $T_{short}$ can be successively optimized during operation by, especially iterative, approximation procedures. For the case in which, with expiration of the currently valid time span $T_{short}$, the electrical current end value $I_c$ has not yet been reached, the time span $T_{short}$ is correspondingly lengthened, for example by an initially determined, suitable, step size; for the case in which, before the expiration of the time span $T_{short}$, the electrical current end value $I_c$ has already been reached, the time span $T_{short}$ can, as required, again be decreased some. Through the interaction of applied extra voltage and subsequent, short-time application of the counter voltage $U_{short}$, the eddy currents can be effectively compensated and, thus, their decay time significantly reduced. It is to be additionally mentioned here that the relevant time spans $T_{rev}$, $T_{short}$, $T_{cont}$ can, as already indicated, be determined both on the basis of samples of digital data taken from the exciter current and also directly by means of a sample of digital data taken from the exciter current and also directly by means of time measuring circuits correspondingly triggered by the exciter current $I_M$ and/or by the voltage driving such.

A third decision stage implemented in the microcomputer reviews—assuming that the voltage $U_H$ is momentarily held constant—continuously the electrical current samples s on the basis of the criterion, whether electrical current samples s following one after the other indicate a constant exciter current $I_M$, or not. For the case in which the assumption of a constant voltage seems too uncertain, its actual instantaneous waveform, for example likewise in the form of digital samples, is appropriately brought into the decision. The decision stage issues, as appropriate, at a CONSTANT-output a control signal correspondingly signalizing a continuing constant exciter current $I_M$, for so long until a further sinking of the exciter current $I_M$ below a change boundary value set for the constancy of the exciter current $I_M$ is recognized.

Based on the above method optimizing the time span $T_{cont}$ maximally available during each half-period for producing the actual measured, or also diagnosis, values, additionally the following method is provided for improving the information provided by the diagnosis value:

The voltage $U_H$ instantaneously driving the exciter current $I_M$ is, at a second point in time, $t_2$, changed from the second voltage level, $U_{drv}$, to an, especially constant, or controlled to be constant, third voltage level, $U_{short}$, in order to achieve a sinking of the electrical current strength of the exciter current $I_M$ from the maximum current value, $I_m$, instantaneously flowing in the at least one field coil, down to an, especially constant, electrical current end value, $I_{czu}$, predetermined for the exciter current $I_M$. In such case, the third voltage level, $U_{short}$, is chosen smaller than the second voltage level, $U_{rev}$. For determining a third point in time, $t_3$, corresponding to the reaching of the electrical current end value, $I_c$, the exciter current $I_M$ is registered, at least at times. Based on this, there is chosen for the magnetic field system, a first time constant, $T_{short}$, which corresponds to a time span, $t_3$-$t_2$, lying between the second point in time, $t_2$, and the third point in time, $t_3$, and/or a second time constant, $T_{rev}$+$T_{short}$, which corresponds to a time span $t_3$-$t_1$, lying between the first point in time, $t_1$, and the third point in time, $t_3$. For determining a diagnosis value representing an instantaneous operating state of the flow meter, the determined first time constant, $T_{short}$, is then compared with a predetermined first reference value, $T_{1ref}$, and/or the determined second time constant, $T_{rev}$+$T_{short}$, is compared with a predetermined, second reference value, $T_{2ref}$.

According to an embodiment of the invention, it is provided that the measuring and operating circuit short-circuits the coil arrangement during the time span $T_{short}$. Alternatively, it is provided that the measuring and operating circuit again reverses the direction of the current flowing through the coil arrangement during the time span $t_{short}$.

According to a further embodiment of the invention, it is provided that the measuring and operating circuit so selects the time span $t_{short}$ that the exciter current flowing through the coil arrangement at the expiration of the time span $t_{short}$ has at least approximately reached the constant electrical current end value, $I_c$.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

The invention claimed is:

1. A method for operating a magneto-inductive flow meter adopted to measure a volume flow rate and/or a flow velocity of a flowing fluid, the meter comprising a measuring tube for conveying the fluid to be measured, a magnetic field system, which includes at least one field coil, through which an exciter current flows for producing a magnetic field passing through the fluid at least partially perpendicularly to a stream direction, and electrodes for producing at least one measurement signal corresponding to a voltage arising in the fluid flowing through the measuring tube, the method comprising the steps of:

producing the magnetic fluid passing through the fluid;
sensing electrical potentials induced in the flowing fluid; and
producing said at least one measurement signal, and supplying the at least one measurement signal to an evaluating circuit, wherein the step of producing the magnetic fluid includes the following steps:
changing a voltage driving the exciter current, at a first point in time, $t_1$, from an instantaneous first voltage level, being different from zero, to a second voltage level, being constant or controlled to be constant, for increasing to a maximum current value, a current strength, of the exciter current driven by the voltage and flowing in the at least one field coil, said second voltage level, being selected to be greater than said first voltage level, and
changing the voltage instantaneously driving the exciter current, at a second point in time, $t_2$, from said second voltage level, to a third voltage level, being constant or controlled to be constant, for sinking the exciter current instantaneously flowing in the at least one field coil, from said maximum electrical current value, to a constant electrical current end value, predetermined for the exciter current said third voltage level, being selected to be smaller than the second voltage level.

2. The method as claimed in claim 1, wherein: the third voltage level, is chosen smaller than the first voltage level.

3. The method as claimed in claim 1, wherein:
the voltage driving the exciter current is changed in a manner such that its second voltage level, is essentially constant during a time span, $t_2$-$t_1$, lying between the first point in time, $t_1$, and the second point in time, $t_2$, especially also immediately before the second point in time.

4. The method as claimed in claim 1, wherein:
at least one field coil of the coil arrangement is, at least at a time, short-circuited for the adjusting of the voltage to the third voltage level.

5. The method as claimed in claim 1, further comprising the step of:
registering the exciter current for determining a third point in time, $t_3$, corresponding to a reaching of the electrical current end value.

6. The method as claimed in claim 1, further comprising the step of:
determining a first time constant, for the magnetic field system, which corresponds to a time span, $t_3$-$t_2$, lying between the second point in time, $t_2$, and the third point in time, $t_3$.

7. The method as claimed in claim 6, further comprising the step of:
determining a second time constant, for the magnetic field system, which corresponds to a time span, $t_3$-$t_1$, lying between the first point in time, $t_1$, and the third point in time, $t_3$.

8. A method for reviewing a magneto-inductive flow meter, the meter comprising a measuring tube for conveying a fluid to be measured and a magnetic field system, which includes at least one field coil, through which an exciter current flows for producing a magnetic field passing through the fluid at least partially perpendicularly to a stream direction, the method comprising the steps of:
changing a voltage driving the exciter current, at a first point in time, $t_1$, from an instantaneous first voltage level, being different from zero, to a second voltage level, being constant or controlled to be constant, for increasing to a maximum current value, a current strength, of the exciter current driven by the voltage and flowing in the at least one field coil, said second voltage level, is selected to be greater than the first voltage level;

changing the voltage instantaneously driving the exciter current, at a second point in time, $t_2$, from the second voltage level, to a third voltage level, being constant or controlled to be constant, for sinking the exciter current instantaneously flowing in the at least one field coil, from the maximum electrical current value, to an electrical current end value, predetermined for the exciter current being constant, the third voltage level, being selected to be smaller than the second voltage level;

registering the exciter current for determining a third point in time, $t_3$, which corresponds with a reaching of the electrical current end value, determining a first time constant, for the magnetic field system, which corresponds to a time span, $t_3-t_2$, lying between the second point in time, $t_2$, and the third point in time, $t_3$, and/or determining a second time constant, for the magnetic field system, which corresponds to a time span, $t_3-t_1$, lying between the first point in time, $t_1$, and the third point in time, $t_3$; and comparing the determined first time constant, with a predetermined first reference value, $T_{1ref}$, and/or comparing the determined second time constant, with a predetermined second reference value, for determining a diagnosis value representing an instantaneous operating state of the flow meter, and using said diagnosis value to generate an alarm.

9. The method as claimed in claim 8, wherein:

the third voltage level, is chosen smaller than the first voltage level, $U_{cont}$.

10. The method as claimed in claim 8, wherein:

the voltage driving the exciter current is changed in such a manner that its second voltage level, is essentially constant during a time span, $t_2-t_1$, lying between the first point in time, $t_1$, and the second point in time, $t_2$, especially also immediately before the second point in time.

11. The method as claimed in claim 8, wherein:

at least one field coil of the coil arrangement is short-circuited for the adjustment of the voltage to the third voltage level.

* * * * *